(12) United States Patent
Yamagami

(10) Patent No.: US 6,334,025 B1
(45) Date of Patent: *Dec. 25, 2001

(54) APPARATUS FOR PROCESSING IMAGE DATA AND AUDIO DATA

(75) Inventor: Taku Yamagami, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/937,918

(22) Filed: Sep. 25, 1997

Related U.S. Application Data

(63) Continuation of application No. 08/358,419, filed on Dec. 19, 1994, now abandoned.

(30) Foreign Application Priority Data

Dec. 24, 1993 (JP) ...................................... 5-328033

(51) Int. Cl.[7] ................................................. H04N 5/928
(52) U.S. Cl. ................................. 386/96; 386/95
(58) Field of Search .................... 386/52, 55, 54, 386/46, 83, 4, 95, 96, 104, 124, 100, 102, 61; 760/32; H04N 5/928

(56) References Cited

U.S. PATENT DOCUMENTS

| | | | | |
|---|---|---|---|---|
| 4,553,206 | * | 11/1985 | Smutek et al. | 364/300 |
| 4,777,537 | * | 10/1988 | Ueno et al. | 358/341 |
| 5,031,113 | * | 7/1991 | Hollerbauer | 364/513.5 |
| 5,122,886 | * | 6/1992 | Tanaka | 358/335 |
| 5,371,602 | * | 12/1994 | Tsuboi et al. | 358/335 |
| 5,568,275 | * | 10/1996 | Norton et al. | 386/52 |
| 5,689,618 | * | 11/1997 | Gasper et al. | 395/285 |

\* cited by examiner

*Primary Examiner*—Robert Chevalier
(74) *Attorney, Agent, or Firm*—Morgan & Finnegan, L.L.P.

(57) ABSTRACT

An apparatus for processing image data and audio data includes a recording medium for storing mutually linked files in each of which are stored data wherein both image data and audio data are capable of being referred to in mutual fashion, a pointing device for designating image data, which is desired to be reproduced, the image data being stored on the recording medium and displayed as an icon, a CPU, which is for signal processing control, adapted to retrieve, as file information, audio data associated with the image data designated by the pointing device, and an audio output unit for reading out and displaying the audio data retrieved by the CPU.

21 Claims, 11 Drawing Sheets

APPARATUS FOR PROCESSING IMAGE DATA AND AUDIO DATA

This is a continuation of application Ser. No. 08/358,419, filed on Dec. 19, 1994 now, abandoned.

BACKGROUND OF THE INVENTION

FIELD OF THE INVENTION

This invention relates to an apparatus for processing, recording and reproducing images and audio.

In known digital electronic cameras whose specifications conform to the still-video recording format, image and audio data is processed and recorded on a digital recording medium such as a hard disk or floppy disk.

In the conventional still-video recording format, the image data and audio data are each frequency-modulated and recorded on separate tracks. In the audio track, a field for recording the track channel number of the associated image track (video track) is provided in a control track and it is so arranged that an annotation (identifying information), regarding a specific image can be recorded at the same time.

However, the following problems are encountered in the conventional digital electronic camera of the type described above:

(1) With the still-video recording format, a video track desired to be referred to can be designated from an audio track but an associated audio track cannot be designated from a video track. Accordingly, in order to determine the relationship between audio data and image data, all tracks on a still-video floppy disk serving as the recording medium must be retrieved, all of the audio tracks must be played back and the video track desired to be referred from the audio track must be found. Since this inevitably requires an enormous amount of time, this approach involves considerable waste and is not realistic.

(2) Only one image can be referred to from an audio track. In a case where it is desired to refer to a plurality of images, therefore, one item of audio cannot be made to correspond to the plurality of images in common. Accordingly, if it is desired to annotate a plurality of images under a common concept by voice, this cannot be accomplished at one time.

(3) In order to record audio data on a recording medium, a large storage capacity is necessary. As a consequence, recording a simple annotation regarding an image on an audio track is inappropriate in terms of cost.

These problems relating to the conventional digital electronic camera arise not only in digital electronic cameras but also generally in apparatus that process audio data and image data.

SUMMARY OF THE INVENTION

Accordingly, an object of the present invention is to provide an apparatus for processing audio data and image data, in which it is possible link files in which a stored file of image data can be linked with at least a stored file of audio or character data and either file can be retrieved from the other at high speed and reproduced, and in which it is possible to readily edit and record an expression of the mutual relationship among the image, audio and text files.

Another object of the present invention is to provide an apparatus for processing audio data and image data, in which audio data or image data can be recorded upon being converted to a text format, as a result of which an annotation (identifying information) can be appended to image data using only a small amount of memory capacity.

A further object of the present invention is to provide an apparatus for processing audio data and image data, in which audio data and image data can be retrieved on the basis of a text file appended as an annotation and it is possible to use the text file as a keyword when a data base is created.

Still another object of the present invention is to provide an apparatus for processing audio data and image data, the apparatus being capable of executing processing such as recording audio data or image data upon automatically linking this data with information that has been recorded on another data base.

According to the present invention, the foregoing objects are attained by providing an apparatus for processing image data and audio data, comprising recording means for recording image data and audio data on a recording medium in associated form, designating means for designating the audio data that has been recorded on said recording medium, retrieving means for retrieving the image data associated with the designated audio data by said designating means, reproducing means for reading the retrieved image data by said retrieving means out of said recording medium and reproducing this image data, and character recognition means for performing character recognition based upon the image data, wherein registration processing is executed in such a manner that results of character recognition performed by said character recognition means can be recorded and retrieved, as a text data, in association with the image data and the audio data.

According to the present invention, the foregoing objects are attained by providing an apparatus for processing image data and audio data, comprising recording means for recording image data and audio data on a recording medium in associated form, designating means for designating the audio data that has been recorded on said recording medium, retrieving means for retrieving the image data associated with the designated audio data by said designating means, reproducing means for reading the retrieved image data by said retrieving means out of said recording medium and reproducing this image data, and audio recognition means for recognizing the audio data as audios, wherein registration processing is executed in such a manner that results of audio recognition performed by said audio recognition means can be recorded and retrieved, as a text data, in association with the image data and the audio data.

According to the present invention, the foregoing objects are attained by providing an apparatus for processing image data and audio data, comprising recording means for recording image data and audio data on a recording medium in associated form, designating means for designating the image data that has been recorded on said recording medium, retrieving means for retrieving the audio data associated with the designated image data by said designating means, reproducing means for reading the retrieved audio data by said retrieving means out of said recording medium and reproducing this audio data, and character recognition means for performing character recognition based upon the image data, wherein registration processing is executed in such a manner that results of character recognition performed by said character recognition means can be recorded and retrieved, as a text data, in association with the image data and the audio data.

According to the present invention, the foregoing objects are attained by providing an apparatus for processing image data and audio data, comprising recording means for recording image data and audio data on a recording medium in associated form, designating means for designating the image data that has been recorded on said recording medium, retrieving means for retrieving, as file information, the audio data associated with the designated image data, reproducing means for reading the retrieved audio data out of said recording medium and reproducing this audio data, and audio recognition means for recognizing the audio data as characters, wherein registration processing is executed in such a manner that results of audio recognition performed by said audio recognition means can be recorded and retrieved, as a text data, in association with the image data and the audio data.

According to the present invention, the foregoing objects are attained by providing an apparatus for processing image data and audio data, comprising recording means for recording image data and audio data on a recording medium in associated form, designating means for designating one item of audio data that has been recorded on said recording medium, retrieving means for retrieving, as file information, plural items of image data associated with the designated one item of audio data by said designating means, reproducing means for reading the retrieved plural items of image data by said retrieving means out of said recording medium and reproducing this image data, and character recognition means for performing character recognition based upon the image data, wherein registration processing is executed in such a manner that results of character recognition performed by said character recognition means can be recorded and retrieved, as a text data, in association with the audio data and the image data.

According to the present invention, the foregoing objects are attained by providing an apparatus for processing image data and audio data, comprising recording means for recording image data and audio data on a recording medium in associated form, designating means for designating one item of audio data that has been recorded on said recording medium, retrieving means for retrieving, as file information, plural items of image data associated with the designated one item of audio data by said designating means, reproducing means for reading the retrieved plural items of image data by said retrieving means out of said recording medium and reproducing this image data, and audio recognition means for recognizing the audio data as characters, wherein registration processing is executed in such a manner that results of audio recognition performed by said audio recognition means can be recorded and retrieved, as a text data, in association with the audio data and the image data.

According to the present invention, the foregoing objects are attained by providing an apparatus for processing image data and audio data, comprising recording means for recording image data and audio data on a recording medium in associated form, designating means for designating one item of image data that has been recorded on said recording medium, retrieving means for retrieving plural items of audio data associated with the designated one item of image data by said designating means, reproducing means for reading the retrieved plural items of audio data by said retrieving means out of said recording medium and reproducing this audio data, and character recognition means for performing character recognition based upon the image data, wherein registration processing is executed in such a manner that results of character recognition performed by said character recognition means can be recorded and retrieved, as a text data, in association with the image data and the audio data.

According to the present invention, the foregoing objects are attained by providing an apparatus for processing image data and audio data, comprising recording means for recording image data and audio data on a recording medium in associated form, designating means for designating one item of image data that has been recorded on said recording medium, retrieving means for retrieving plural items of audio data associated with the designated one item of image data by said designating means, reproducing means for reading the retrieved plural items of audio data by said retrieving means out of said recording medium and reproducing this audio data, and audio recognition means for recognizing the audio data as characters, wherein registration processing is executed in such a manner that results of audio recognition performed by said audio recognition means can be recorded and retrieved, as a text data, in association with the image data and the audio data.

According to the present invention, the foregoing objects are attained by providing an apparatus for processing audio data, comprising recording means for recording plural items of audio data on a recording medium, designating means for designating the plural items of audio data that have been recorded on said recording medium, grouping means for grouping, in mutual association, the designated plural items of audio data by said designating means, retrieving means for retrieving, as file information, the plural items of audio data that have been grouped, and readout means for reading the retrieved plural items of audio data out of said recording medium and reproducing this audio data.

According to the present invention, the foregoing objects are attained by providing an apparatus for processing image data comprising recording means for recording plural items of audio data on a recording medium, designating means for designating the plural items of audio data that have been recorded on said recording medium, grouping means for grouping, in mutual association, the designated plural items of image data by said designating means, retrieving means for retrieving, as file information, the plural items of image data that have been grouped, and reproducing means for reading the retrieved plural items of image data by said retrieving means out of said recording medium and reproducing this image data.

According to the present invention, the foregoing objects are attained by providing an apparatus for processing image data and audio data, comprising recording means for recording a plurality of items of image data and audio data on a recording medium in associated form, designating means for designating the plurality of items of image data and audio data that have been recorded on said recording medium, grouping means for grouping, in mutual association, the designated plurality of items of image data and audio data by said designating means, retrieving means for retrieving, as file information, the plurality of items of image data and audio data that have been grouped, and reproducing means for reading the retrieved plurality of items of image data and audio data out of said recording medium and reproducing this image data and audio data.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention and therefore reference is made to the claims which follow the description for determining the scope of the invention.

DESCRIPTION OF THE PREFERRED EMBODIMENT

A preferred embodiment of the invention will now be described in detail with reference to the accompanying drawings.

Figure 1:
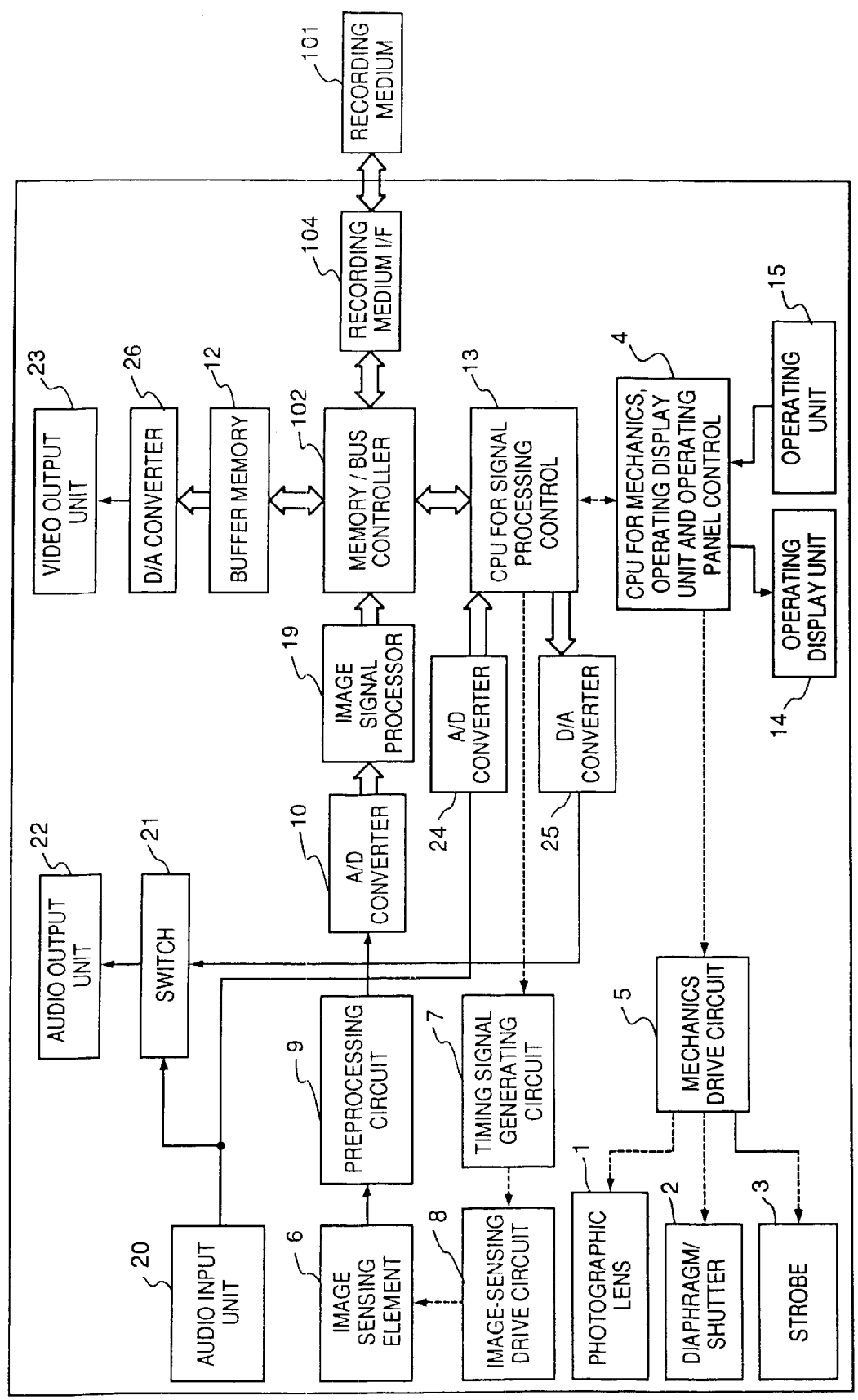
FIG. 1 is a block diagram illustrating the overall construction of a digital electronic camera embodying the present invention.

FIG. 1 is a block diagram illustrating the system configuration of a digital electronic camera embodying the present invention.

With reference to FIG. 1, a recording medium 101 is a memory card or hard disk conforming to PCMCIA standards, by way of example. An audio input unit 20 is an audio-jack connecting circuit or the like, and an audio output unit 22 is a speaker, by way of example. An A/D converter 24 converts the audio signal from an analog to a digital signal, and a D/A converter 25 converts a digital audio signal, which is outputted by a CPU 13 for signal processing control, to an analog signal. A switch 21 selects either the audio signal which enters from the audio input unit 20 or from the CPU 13 for signal processing control and delivers the selected signal to the audio output unit 22. A memory/bus controller 102 receives an input of image data from an image signal processor 19 and is connected to the CPU 13 for signal processing control, a buffer memory 12 for image display and a recording-medium I/F circuit 104 to control the output of image data and audio data.

A D/A converter 26 converts digital image data, which is outputted by the image-display buffer memory 12, to an analog video signal. A video output unit 23 is a video display device for displaying the converted analog video signal as video.

The apparatus further includes a photographic lens 1, a diaphragm/shutter 2 functioning as both a diaphragm and a shutter, a strobe 3 and a CPU 4 for controlling the various camera mechanisms and a control panel. More specifically, the CPU 4 controls operations signals for mechanical operations. A drive circuit 5 drives the various mechanical elements.

An image sensing element 6 is a CCD (charge-coupled device) which converts reflected light from a subject into an electric signal, and a timing signal generating circuit 7 (hereinafter referred to as a "TG") generates a timing signal necessary for operating the image sensing element 6. A drive circuit 8, which is for driving the image sensing element 6, amplifies the signal from the TG 7 to a level at which the image sensing element 6 is capable of being driven. A pre-processing circuit 9 includes a CDS circuit for eliminating output noise produced by the image sensing element 6, and a non-linear amplifier for subjecting the image signal to amplification processing prior to A/D conversion. The CPU 13 for signal processing control is a DSP (digital signal processing) for controlling signal processing circuits such as the memory/bus controller 102. An operating display unit 14 presents a display on an operating unit 15 when auxiliary operations are performed and displays the status of the camera. The operating unit 15 is an input unit such as a keyboard for controlling the camera from the outside. The recording medium 104 is a recording-medium interface circuit for connecting the digital electronic camera and a recording medium 101 on the basis of this embodiment. The format for recording files on the recording medium of the digital electronic camera of this embodiment is capable of using an MS-DOS file recording format, by way of example.

The buffer memory 12 for image display is capable of accessing the image data from the CPU 13 in pixel units and is also capable of outputting control-panel display signals to the video output unit 23 while displaying the image being photographed.

If a track ball or the like is mounted on the operating unit 15 of the digital electronic camera of this embodiment, the camera will be capable of being employed as a user interface similar to that of a GUI (graphic user interface), which employs the pointing device of modern personal computers. More specifically, the CPU 13 for signal processing control outputs various control-panel display signals to the image display buffer 13, and the user is capable of controlling the camera is a variety of ways by using a pointing device (a track ball in this embodiment) to manipulate an operating panel displayed on screen. Further, images, text and various figures are displayed on an image display unit, such as a CRT, by the CPU 13. Thus, a photographed image, the present status of the camera and various information such as file management information regarding the recording medium can be displayed for the user to observe. In this embodiment, the user I/F operation based upon the operating unit 15 and above-mentioned GUI shall be referred to as "operation by the operating unit 15". Further, a clicking or double-clicking operation by the pointing device shall be referred to as an "activating operation".

<Monitoring of Image Recorded in Image Recording Mode>

When the CPU 13 for signal processing senses a recording-mode transition instruction entered by the user from the operating unit 15, the CPU 13 executes the processing below to display the recorded image on the video output unit 23.

Specifically, control of the lens system in conformity with the volition of the photographer is performed by the CPU 4 for mechanical control and the drive circuit 5 for the mechanical system. At this time photographic conditions and the like are displayed on the operating unit 15 to inform the photographer of the camera status. Furthermore, the brightness of the subject is measured by a photometer circuit (not shown), and a value representing the f-stop of the diaphragm/shutter 2 and data such as shutter speed are operated upon by the CPU 4. The diaphragm/shutter 2 is driven by the drive circuit 5 for the mechanical system on the basis of a control value computed by the CPU 4, and a strobe 3 is fired in dependence upon the output of the photometer circuit (not shown), whereby the subject is photographed. Reflected light from the subject thus exposed impinges upon the image sensing element 6 via the photographic lens 1 and diaphragm/shutter 2. The latter regulates the amount of light incident upon the image sensing element 6. In a case where an interlaced-readout CCD is used as the image sensing element, the diaphragm/shutter 2 is provided in order to arrange it so that the incident light will not adversely affect the signal charge during the transfer of the image. The image sensing element 6 is operated by a drive signal obtained as a result of the output from the TG 7 being amplified by the sensing-element drive circuit 8. The TG 7 has its operation controlled by the CPU 13 for signal processing control. The output of the image sensing element 6 thus driven is sent to the preprocessing circuit 9. The latter executes CDS processing for removing low-frequency noise which occurs in the signal outputted by the image sensing element 6, as well as processing for non-linearizing the output signal from the image sensing element 6 in order to utilize the dynamic range (the digitized signal data) of the A/D converter 10 effectively. The preprocessed output signal from the image sensing element 6 is converted to a digital signal in the A/D converter 10, the resulting digital signal is converted to standard component video (e.g., a luminance signal and two color-difference signals or RGB signals), and the video enters the memory/bus controller 102. Under the control of the CPU 13 for signal processing control, the memory/bus controller 102 continuously delivers the digitized output signal of the image sensing element 6 to the buffer memory 12 for image display.

Figure 2:
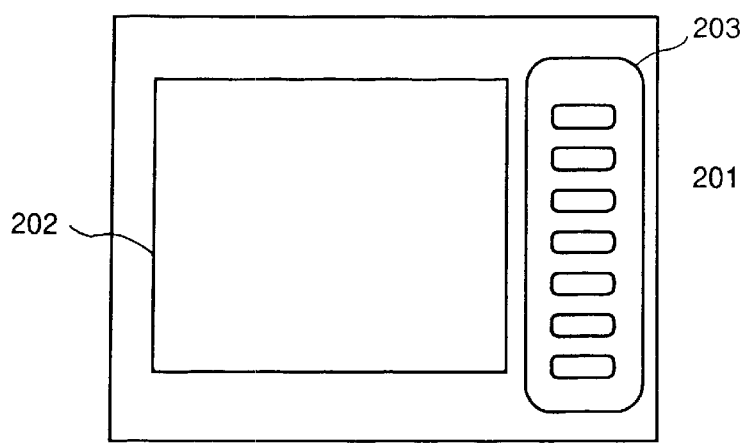
FIG. 2 is a diagram showing an example of a display format in an image recording mode.

FIG. 2 is a diagram showing an example of a display format in the image recording mode of the digital electronic camera according to this embodiment. As shown in FIG. 2 by way of example, the display image delivered to the video display unit 201 is displayed upon being split into a monitor area 202 for monitoring the recorded image, and a control panel 203 for parameters such as camera status and photographic conditions capable of being set on the user side. The digital image data outputted by the buffer memory 12 for image display is converted to an analog video signal by the A/D converter 26 and the analog video signal is delivered to the video output unit 23, which proceeds to display the signal. The image to be recorded on the recording medium is capable of being verified by the user as a moving picture in the monitor area 202.

By virtue of the foregoing processing, the moving picture sensed by the image sensing element 6 is displayed on the video output unit 23.

<Recording of Images>

When the photographer manipulates the operating unit 15 to instruct the camera to execute photography, the CPU 13 for signal processing control halts the display of the moving picture, accesses the image data, which has been retained in the buffer memory 12 for image display, via the memory/bus controller 102, compresses the digital image data and then records the compressed digital image data on the recording medium 101.

If the memory/bus controller 102 halts the writing of the moving picture in the buffer memory 12 in the transfer interval and for a fixed period of time after the end of recording, the image recorded is displayed on the video output unit 23 as a still picture. Accordingly, by observing the video output unit 23, the photographer can confirm the still picture just recorded.

In order to check the content of a recorded image more rapidly after photography, the compressed image represented by the compressed image data can be added on to an image file as compressed image data by the CPU 13 for signal processing control. For example, even if an image whose data is compressed to one-eighth of the original image horizontally and vertically is added on to the image file, the necessary file capacity is not increased that much. This image of reduced data is referred to as an "index image".

<Monitoring and Recording of Audio at Time of Audio Recording>

When the recording mode is in effect, the output of the audio input unit 20 is selected as the input to the audio output unit 22 by the switch circuit 21. The CPU 13 for signal processing control is capable of monitoring the audio recorded on the recording medium 101.

Upon sensing an audio recording instruction entered by the user from the operating unit 15, the CPU 13 for signal processing control receives the digital audio data resulting from the conversion performed by the A/D converter 24 and delivers the received data to the recording medium I/F 104 via the memory/bus controller 102.

Upon sensing that the user has canceled the audio recording instruction at the operating unit 15 or upon construing that the audio recording instruction has been canceled owing to elapse of a predetermined period of time, the CPU 13 terminates the recording of video.

<Simultaneous Recording of Video and Audio>

In a case where an image and audio are recorded simultaneously, the CPU 13 temporarily saves the audio data received from the A/D converter 24 in an internal buffer of the CPU 13 while the image is being compressed and outputted to the recording medium I/F 104 as described in the "Recording of images" section above. When the output of the image ends, the CPU 13 transfers the audio data from the internal buffer to the recording medium I/F 104. For example, with the NTSC system, one field, whose duration is 16.7 milliseconds, includes a vertical synchronizing interval and a vertical blanking interval of 1,4 milliseconds, which is devoid of a video signal, located before or after the vertical synchronizing interval. In a case where image data is transferred at the ordinary video-data transfer rate, image data that has not been subjected to signal processing is transferred in the period of time (about 15 milliseconds) left after excluding the vertical blanking interval. In order to achieve this, the data is transferred at a speed of about 10 Mbyte/sec.

It may be desired to transfer audio data to the recording medium in the vertical blanking interval. The amount of data corresponding to 16.7 milliseconds is about 370 bytes if the audio data is sampled at 22 kHz and eight bits per sample. Accordingly, in a case where the data is transferred in the remaining 1.4 milliseconds, a transfer speed of about 260 Kbyte/sec is required. This transfer speed is fully satisfactory if the recording medium is a memory card conforming to PCMCIA standards, by way of example.

By executing time-division multiplexing in which audio data is transferred in the vertical blanking interval and image data is transferred in the video output interval of the scanning interval of one screen, as described above, the digital electronic camera of this embodiment is capable of recording both video and audio simultaneously while the video and audio are monitored simultaneously.

In order that audio data monitored and recorded at the same time as an image may be regarded as information associated with the image, the files of the image data and audio data are managed to correlate the two types of data. This will be described later in a section dealing with the linking of audio and text to image files.

Audio data may be transferred within the horizontal blanking interval of a video signal. For example, when audio is sampled under conditions of 44.1 kHz, stereo and eight bits, six-byte or four-byte audio data is transferred and recorded within a single horizontal blanking interval (an interval of 1H). When use is made of a medium having a recording mechanism such as an HDD as the recording medium, the audio data should be recorded by interleaving every 1H interval. In the case of a semiconductor memory, however, it is unnecessary to interleave the image data and audio data every 1H interval. In this case interleaved recording every 1V interval may be performed so as to record the audio data before the image data of one field (1V).

<Recording of Text Data>

With the digital electronic camera of this embodiment, an increase in necessary memory capacity for the purpose of annotating images can be reduced significantly by putting images and audio into the form of text data through application of character recognition.

<① Recording by Character Recognition>

Figure 3:
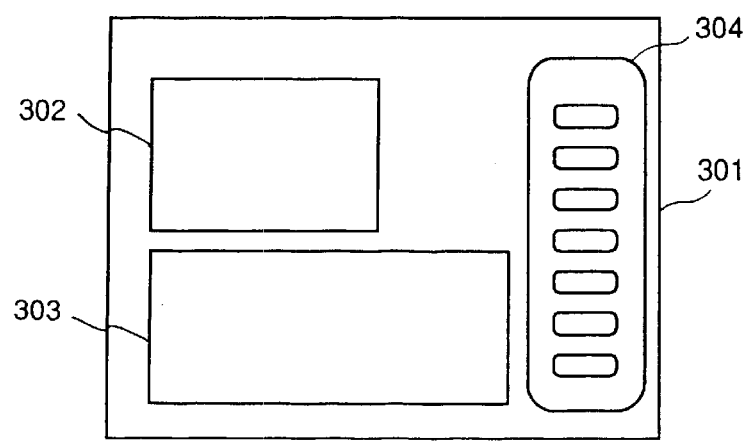
FIG. 3 is a diagram showing an example of a display format in a character recognition mode.

When the CPU 13 for signal processing control senses an instruction, which is entered by the user from the operating unit 15, for a transition to a character-recognition recording mode, the digital electronic camera of this embodiment performs processing similar to that for monitoring recording in the image recording mode and outputs an image, which is to be subjected to character recognition, to an image display section 301 (FIG. 3). At this time the image displayed on the image display section 301 is displayed upon being split into an image 302 to undergo character recognition, a character recognition section 303 for displaying results of character recognition, and a control panel 304 for parameters such as camera status and photographic conditions capable of being set by the user. This is illustrated in FIG. 3.

The processing described below is executed repeatedly while execution of character recognition is being designated by the user at the operating unit 15.

Specifically, the CPU 13 for image processing control temporarily halts the writing of image data in the image-display buffer memory 12 and subjects the image to character recognition processing. When the character recognition processing of the image in the buffer memory 12 is finished, the CPU 13 causes the results of recognition to be displayed in the display area 303 shown in FIG. 3.

When satisfactory results of recognition are obtained, the user manipulates the operating unit 15 to terminate the instruction to execute character recognition. At this time the user employs the operating unit 15 to instruct the CPU 13 to decide text data that has undergone character recognition. The camera records the decided text data on the recording medium 101 via the memory/bus controller 102 and recording medium I/F 104. In a case where text data has not been decided, the image to undergo character recognition is written in the buffer memory 12 again and the above-described character recognition operation is repeated.

<② Recording by Audio Recognition)

Figure 4:
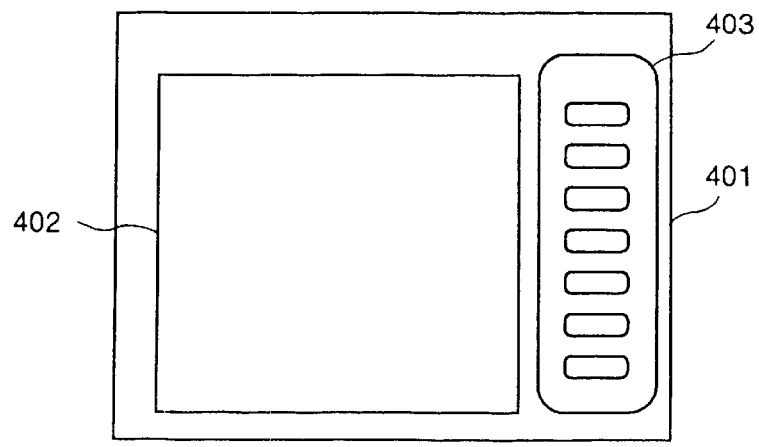
FIG. 4 is a diagram showing an example of a display format in an audio recognition mode.

When the CPU 13 for signal processing control senses an instruction, which is entered by the user from the operating unit 15, for a transition to an audio-recognition recording mode, the digital electronic camera of this embodiment monitors audio by executing processing similar to that for monitoring and recording of audio at the time of audio recording, described above. At this time the image displayed on a image display section 401 is displayed upon being split into a section 402 which displays the results obtained by audio recognition, and a control panel 403 for parameters such as camera status and recognition conditions capable of being set by the user. This is illustrated in FIG. 4. The control panel can be constructed as a control panel 130 in FIG. 13, which represents a specific, more preferred example.

During the time that execution of audio recognition is being designated by the user at the operating unit 15, the CPU 13 for signal processing control accepts the audio data that has been converted to digital data by the A/D converter 24, executes audio recognition processing and causes the results of recognition to be displayed in the display section 402 of FIG. 4.

When satisfactory results of recognition are obtained, the user manipulates the operating unit 15 to terminate the instruction to execute audio recognition.

In a case where the results of audio recognition are unsatisfactory, execution of audio recognition is instructed again by using the operating unit 15.

If satisfactory results of audio recognition are obtained, at this time the user employs the operating unit 15 to instruct the CPU 13 to decide text data that has undergone audio recognition. The camera records the decided text data on the recording medium 101 via the memory/bus controller 102 and recording medium I/F 104.

Thus, as will be apparent from the foregoing description, the digital electronic camera according to this embodiment is capable of preserving three types of files, namely files for image data, audio data and text data, on a recording medium.

<File List Display>

Figure 5:
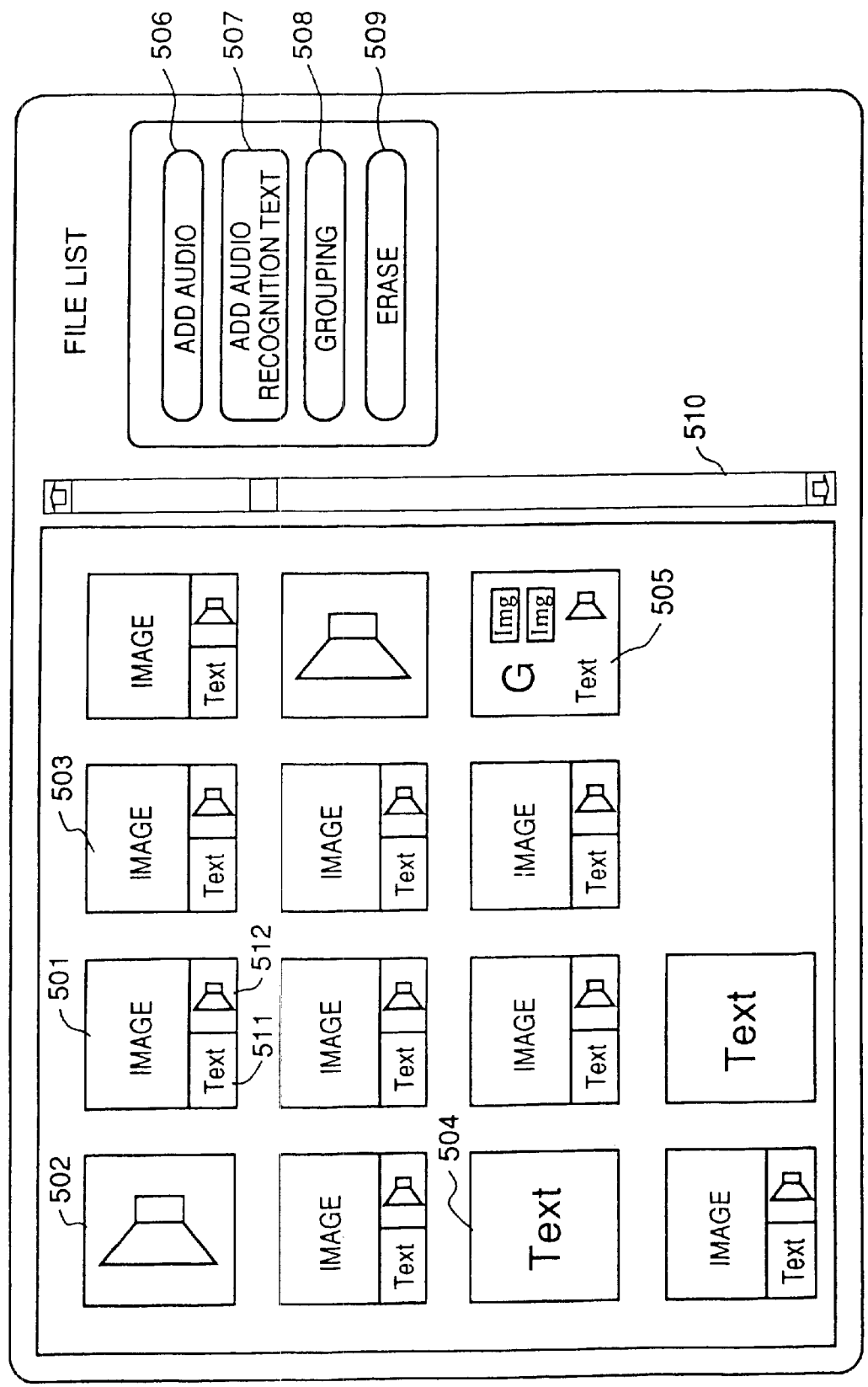
FIG. 5 is a diagram showing an example of a list display format for files that have been stored on a recording medium.

FIG. 5 is a diagram illustrating an example of a display format for displaying a list of recorded files. When the three types of files mentioned above are to be displayed in the form of a directory on the camera display unit, the CPU 13 for signal processing control reads out the files that have been recorded on the recording medium and, in dependence upon the type of file, causes an index image 501 representing an image file to be displayed as an icon with regard to an image as well as audio and text in the form of icons 502, 504, respectively, as illustrated in FIG. 5. These icons can be displayed in order of recording time and it is also possible to display only images, only audio or only text. The user selects the icons representing the index image, audio and text by means of a pointing device and then clicks an erase button 509, whereupon the camera erases the selected files.

The small icons 511, 512 for audio and text, respectively, at the bottom of the index image 501 indicate whether there is text or audio linked to this image file. Text and audio are recorded upon being linked in accordance with a method of linking audio and text to image files, described later. For example, the fact that data is present is expressed by making the color of an icon a gray level, as in the case of icons 511, 512. These icons are selected and activated using the pointing device to carry out either audio reproduction or text reproduction, described later.

In FIG. 5, a portion 510 of the screen is a scroll bar. When a displayed index image or an object such as an icon will not fit on the screen, the scroll bar 510 is used to scroll the screen up or down so as to retrieve the image or icon. This functions in the same manner as a tool for a window display used in modern personal computers and work stations.

<Enlargement and Reproduction of Images>

Figure 7:
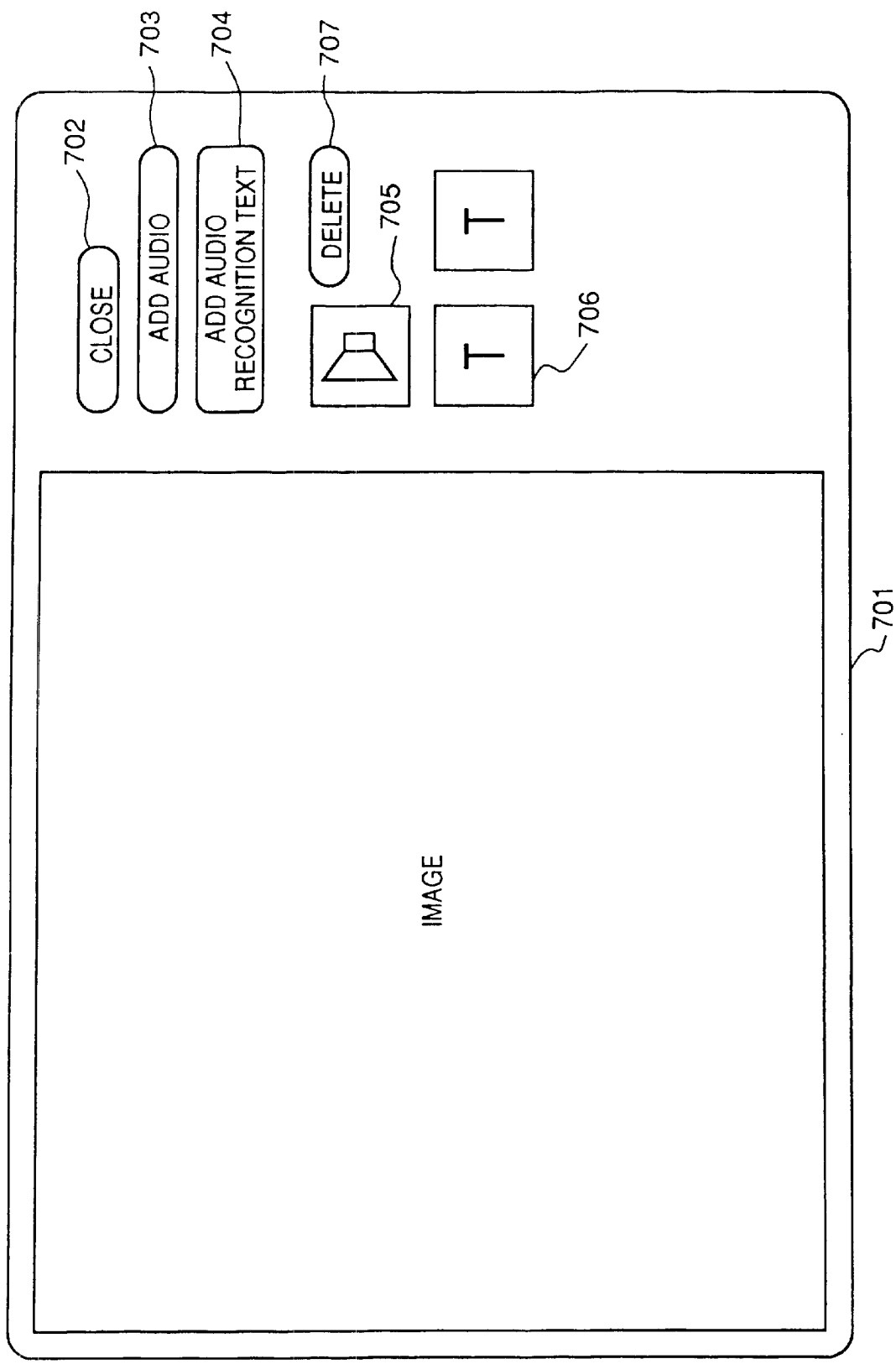
FIG. 7 is a diagram showing an example of a display format for an image file.

FIG. 7 is a diagram showing an example of the display format of an enlarged image. In a case where one image is desired to be reproduced in enlarged form in FIG. 7, the user employs the pointing device on the control unit to select one index image and instruct enlargement of the image (e.g., as by doubling clicking the button). Upon sensing this operation, the CPU 13 for signal processing control reads the compressed image data out of the selected image file, decompresses the image and transfers the decompressed image to the image-display buffer, when the image is displayed on the image display unit. As shown in FIG. 7, the display at this time is presented as a display section 701 for the enlarged image, control buttons 702, 703, 704, and icons 705, 706 representing a linked plurality of audio and text items, respectively.

When the button 702 is activated by the pointing device, the panel of the image displayed in FIG. 7 is closed and the display returns to that of FIG. 5.

<Audio Reproduction>

In a case where data is desired to be reproduced in FIG. 5, the user employs the pointing device on the control unit to select and activate the audio icon.

The CPU 13 controls the switch circuit 21 to connect the audio output signal from the D/A converter 25 to the input of the audio output unit 22. The CPU 13 further controls the recording medium I/F 104 and memory/bus controller 102 to read out the audio data and outputs this audio data to the D/A converter 25 at the sampling period which prevailed at the time of recording. As a result, the audio is outputted from the audio output unit 22.

<Text Reproduction>

Figure 6:
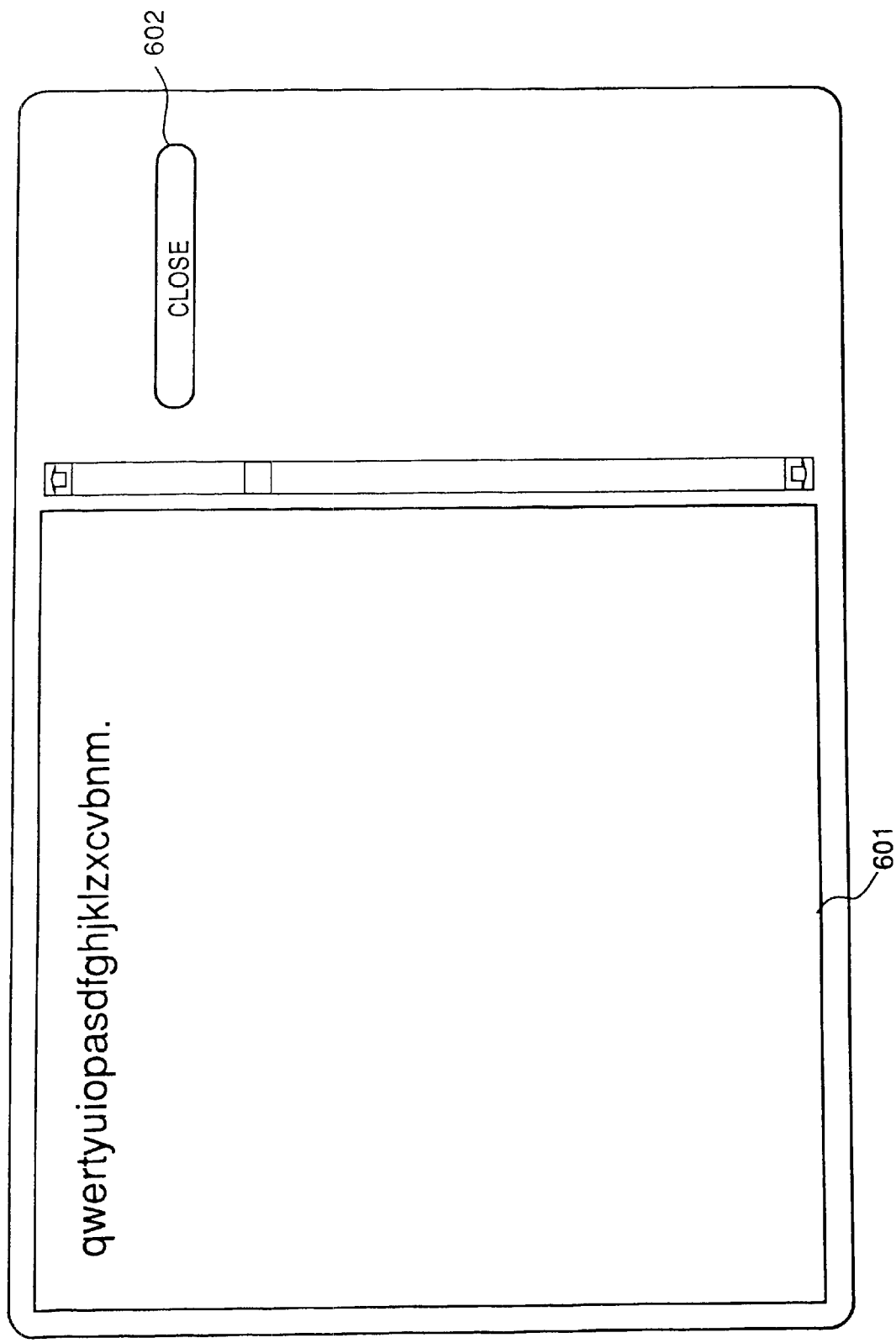
FIG. 6 is a diagram showing an example of a display format for a text file.

In a case where it is desired to display text data, the user employs the pointing device on the control unit to select and activate the text icon 706. FIG. 6 is a diagram illustrating an example of the display format of text data.

The CPU 13 controls the recording medium I/F 104 and memory/bus controller 102 to read out the text data, develops this text data into a character bit pattern and transfers the text data, of the kind shown for example in FIG. 6, to the image-display buffer memory, whereby the text is displayed on the image display unit.

In FIG. 6, a display section 601 for text data and a control button 602 are displayed. When the button 602 is activated by the pointing device, the panel 601 of FIG. 6 closes.

<Linking Audio and Text to Image Files>

Figure 8:
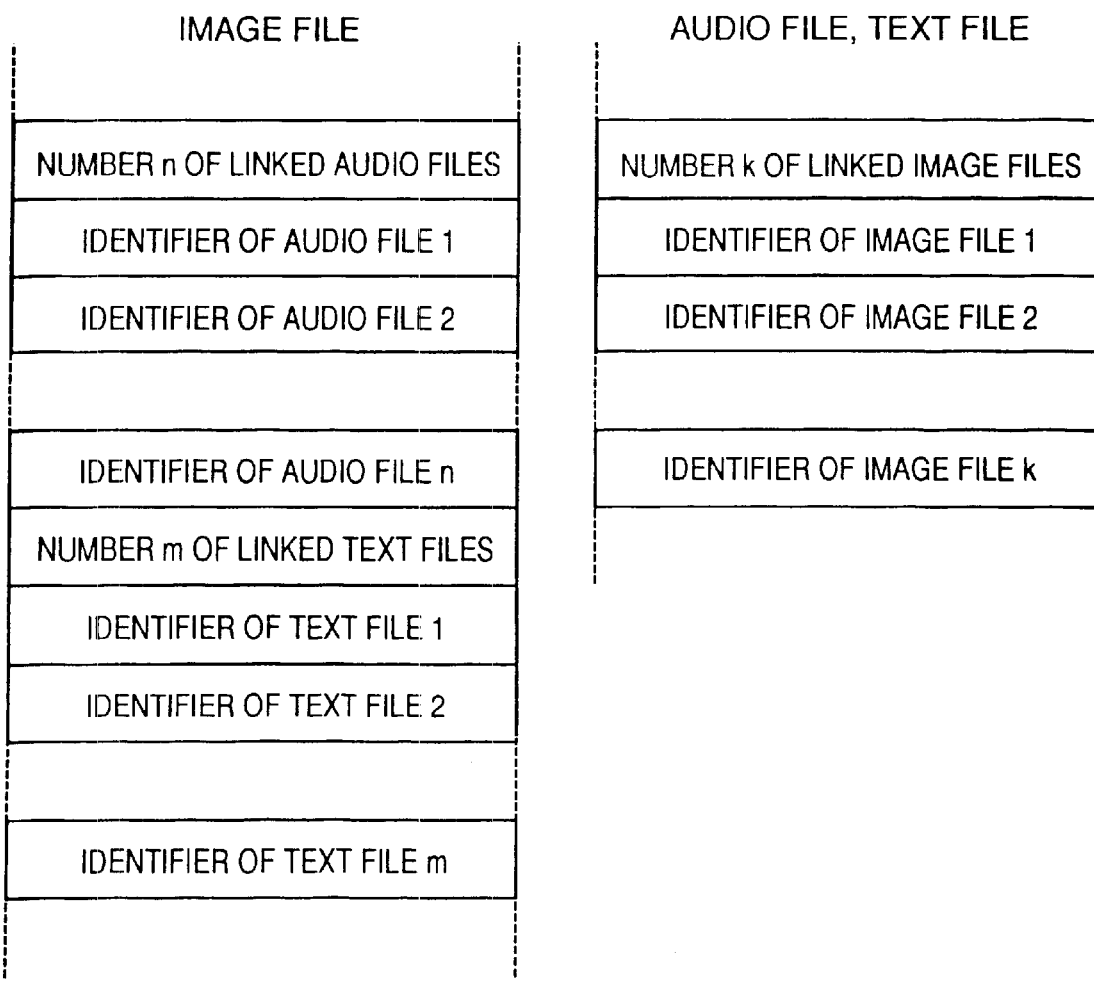
FIG. 8 is a diagram showing the constitution of an image file and a file of audio and text in a case where the two files have been linked.
Figure 13:
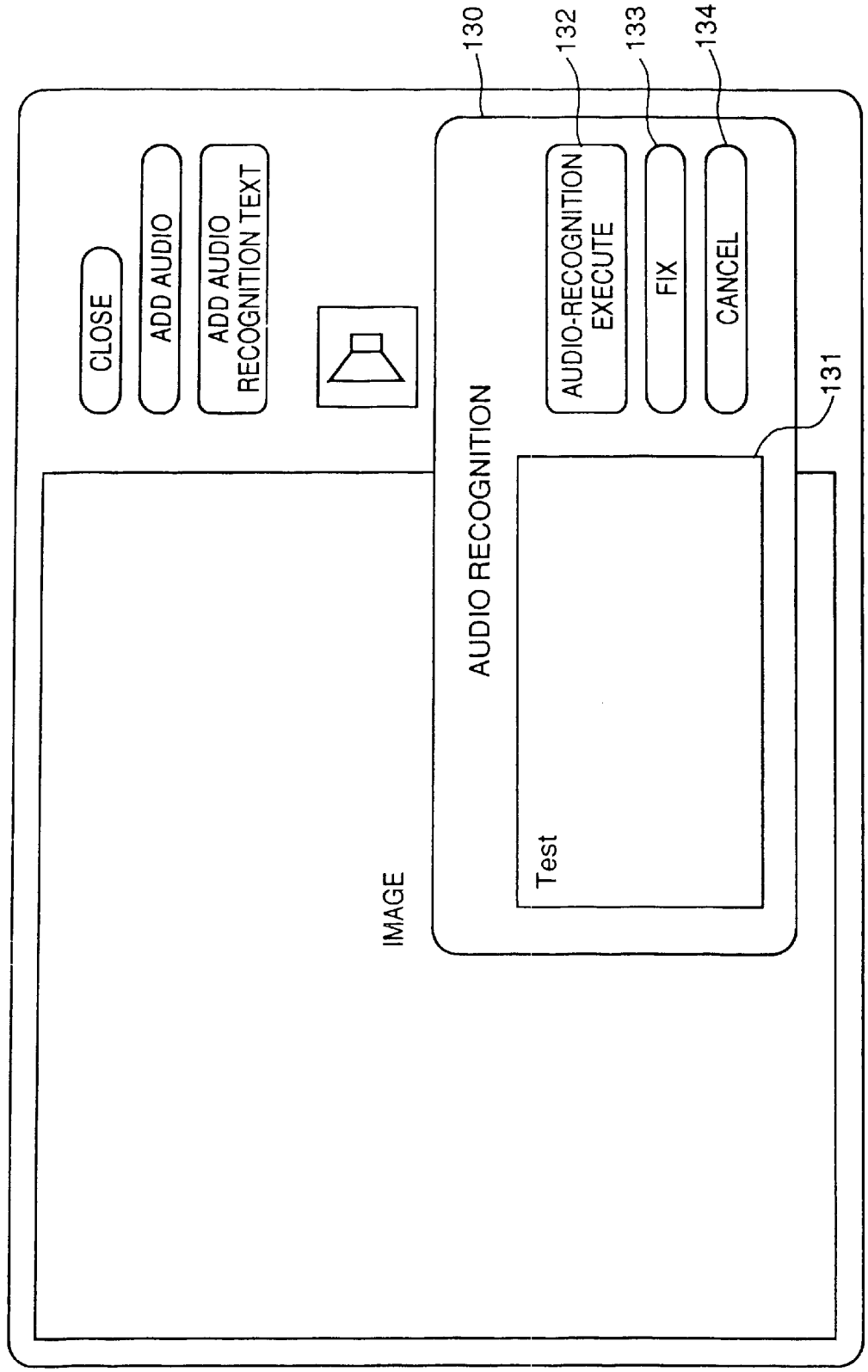
FIG. 13 is a diagram showing an example of a display format when a control panel for audio recognition processing is displayed in a form superimposed on an image display format.

The digital electronic camera according to this embodiment has the control-button icons 703, 704 (FIG. 7) which, when the camera reproduces one image in accordance with the description relating to enlargement and reproduction of images described above, are used to supplement the image with audio or with text data produced by audio recognition processing. When the icons 703, 704 in FIG. 7 are clicked and activated by the pointing device, the CPU 13 for image processing control records audio data and text data by processing similar to that for monitoring and recording of audio at the time of audio recording and that for recording by audio recognition, respectively, described above. This operation can be carried out by enlarging, reproducing and monitoring image data. FIG. 13 is a diagram showing the manner in which the panel 130 for control of audio recognition is displayed in a form superimposed on the image display panel of FIG. 7. For example, the panel 130 for control of audio recognition can be displayed while superimposed upon the image display panel of FIG. 7, as shown in FIG. 13. When image data and audio data are recorded simultaneously, and when audio data and text data are recorded while image data is reproduced and monitored in the manner described above, data for correlating the image file and audio and text files is stored in the files, whereby a file in which the two are linked together is obtained. FIG. 8 illustrates the data composition of an image file and of audio and text files within a linked file.

In FIG. 8, the image file stores the number n of audio files linked thereto, the number m of text files linked thereto and identifiers of the linked files, the numbers of the identifiers corresponding to the numbers (n, m) of linked files. The audio and text file stores the number k of image files linked thereto and identifiers of the linked image files, the number of the identifiers corresponding to the number (k) of linked image files.

If an image file is linked to audio and text files in this manner, audio and text can be referred to not only from an audio file but also from an image file. As a result, even if all files are not searched, as is done in the prior art, the associated audio and text files can be specified from one image file and these files can be played back or displayed.

In a case where audio and text files linked to one image file exist and the image of the image file is displayed, the audio file and text file liked to the image file can be displayed by icons (for example, the icons 511, 512 at the bottom of the image data), as shown in FIGS. 5 and 7. The user selects and activates the icon by the pointing device, whereby the camera plays back the associated audio and displays the associated text.

The text is displayed as shown in FIG. 6. This display can be presented independently or in a form superimposed upon the display screen of FIG. 5 or 7.

If the user selects the icons 705, 706 in FIG. 7 by the pointing device and then clicks the erase button 707, the camera will delete the audio and text files associated with the image. This operation erases the information linking the image file and the audio and text files shown in FIG. 8. It may be so arranged that the audio file or text file whose linkage has been deleted remains independently or is erased.

In order to display a file independently, the file is expressed in the form of the icon 502 or 504 in the list display of FIG. 5.

<Grouping of Plurality Image Files, and Linking of Audio and Text to Group File>

Figure 9:
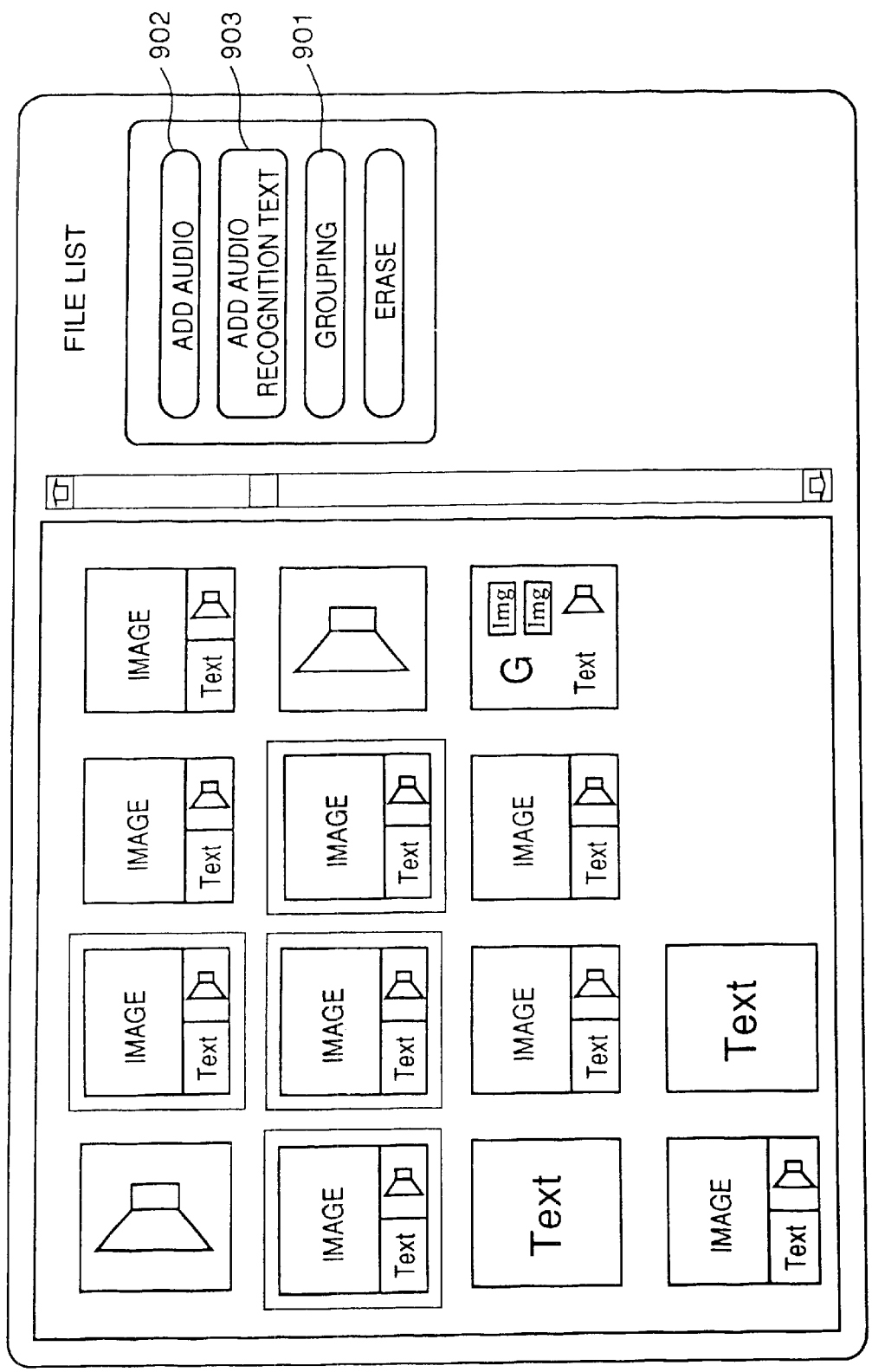
FIG. 9 is a diagram showing an example of a display format in a case where a plurality of files have been selected on a list display.

When a plurality of images are selected by the pointing device in the file list display described above, the index images are displayed within bold frames to emphasize the fact that they have been selected, as shown for example in FIG. 9. Furthermore, when a grouping button 901 in FIG. 9 is clicked using the pointing device, a group of image files is created. At this time, the color of the frames of the index images can be changed to a color different from that of other images in order to emphasize the fact that these index images have been grouped.

Furthermore, if an audio add-on button 902 or audio-recognition text add-on button 903 shown in FIG. 9 is activated by the pointing device, the CPU 13 for signal processing control records audio data or text data in the same manner as in the monitoring and recording of audio at the time of audio recording or as in recording by audio recognition, described above. At this time a plurality items of audio data or text data are added to the group. By virtue of this operation, comments regarding circumstances specific to a group can be applied.

As a result of the operations described above, plural items of images are recorded in a form linked to audio and text. When the files within a group have reference data regarding all files of other groups appended thereto, all files must be searched in order to specify this group subsequently. This make file management difficult.

According to this embodiment, therefore, a group file for holding group information is created the moment occurrence of a group becomes clear. The constitution of this file has the data structure shown in FIG. 10. Specifically, the file includes the numbers of image, audio and text files which belong to a group, as well as identifiers the numbers of which correspond to the numbers of respective files. Further, the image, audio and text files belonging to groups are organized, as shown in FIG. 11, in such a manner that reference can be made to the groups to which the respective files belong. In other words, for an individual file, reference is merely made to the group; no reference is made to the file belonging to the group.

By virtue of this file organization in the groups, group information, i.e., a file belonging to a group, can be specified at high speed from a file of any group, image, audio or text. For example, starting from one image file, another file belonging to this group may be retrieved. In such case, once the affiliated group file has been specified, the identifiers of its files can be specified directly.

Thus, as should be apparent from the above-described embodiment, it is possible for image files to be affiliated with a plurality of groups.

Figure 12:
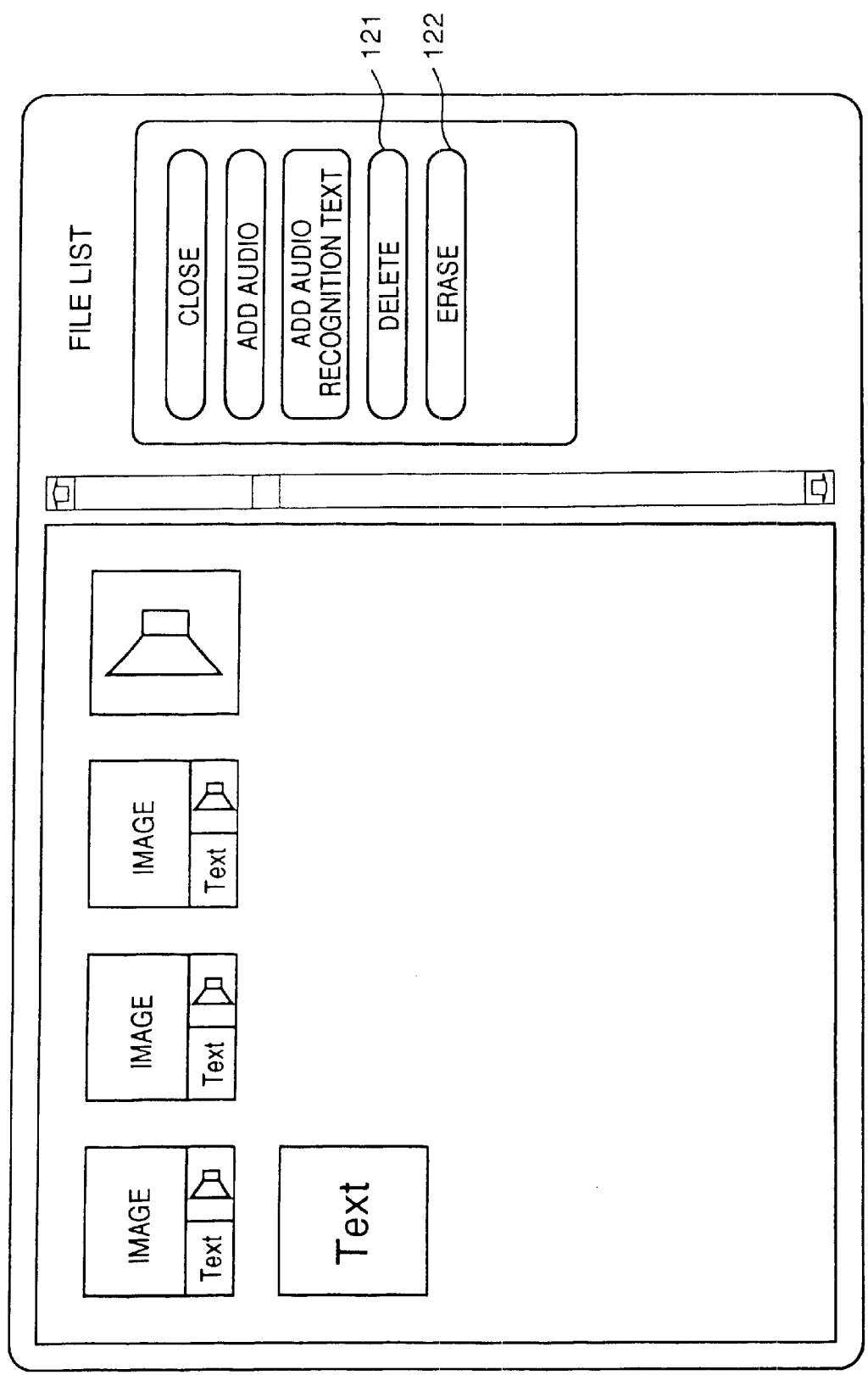
FIG. 12 is a diagram showing an example of a list display format for files belonging to a group.

When a group file is generated through the foregoing procedure, the digital electronic camera of this embodiment displays an icon 505 representing the group file in the file list, as shown in FIG. 5. When this icon is activated by double-clicking it with the pointing device, the files belonging to this group are displayed, as depicted in FIG. 12. If an audio icon and text icon shown in FIG. 12 are clicked and activated by the pointing device, an annotation or explanation regarding matters specific to this group can be presented.

Further, in order for a file belonging to a group to be deleted from the group, the file to be deleted is selected by the pointing device, after which the deletion is executed by clicking the button 121 in FIG. 12. It can be so arranged that audio or text files deleted from a group can continue to exist independently. When such files are made to exist independently of a group, they are displayed in the list display in the form of the icons 501, 502, 504 shown in FIG. 5.

By setting the erase button 122 and activating this button, a selected file may be erased.

Figure 10:
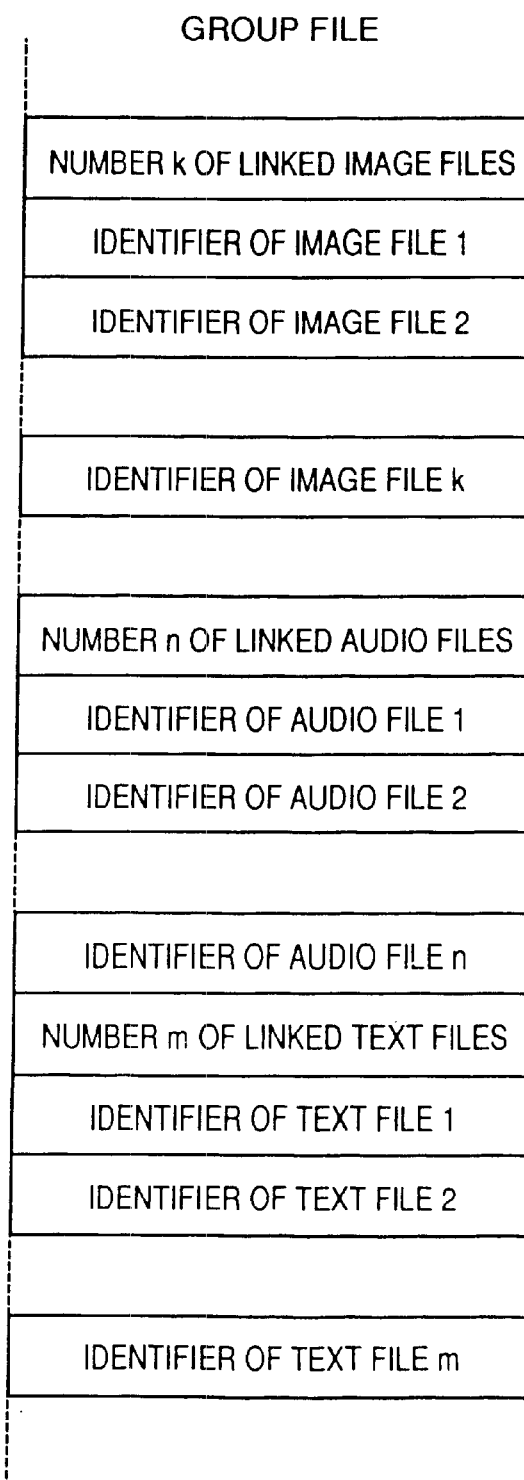
FIG. 10 is a diagram showing the constitution of data in a group file.
Figure 11:
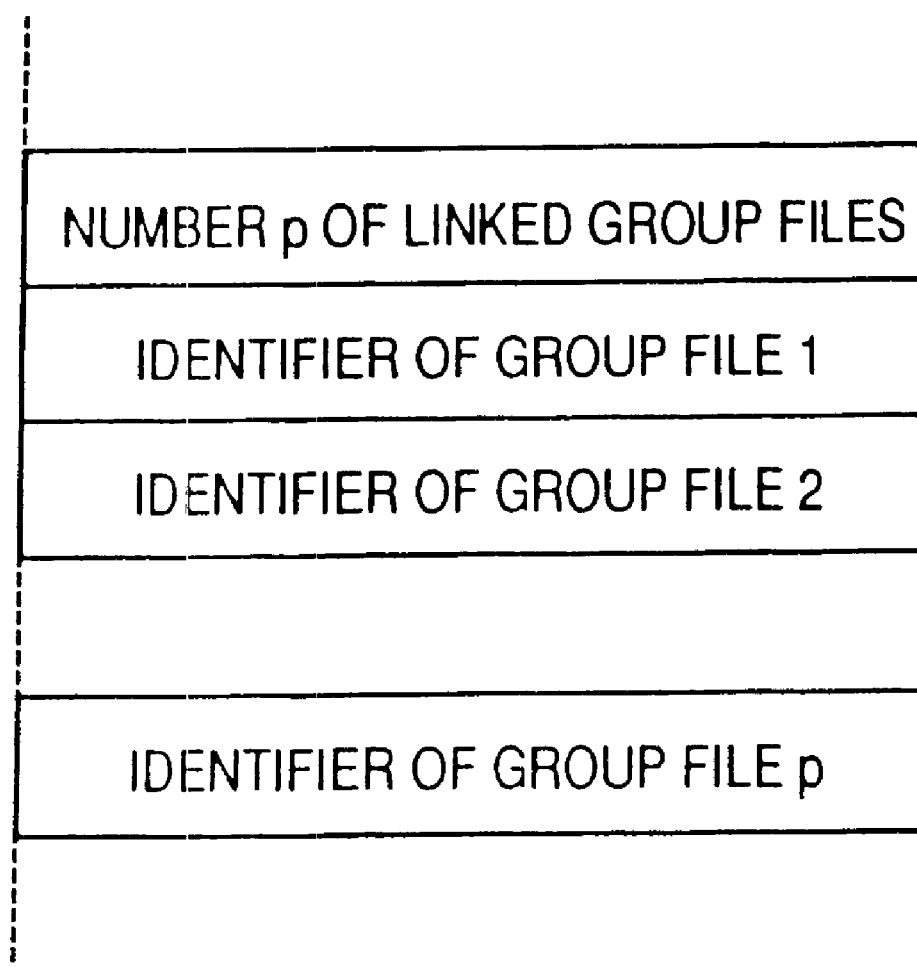
FIG. 11 is a diagram showing the constitution of data in each of image, audio and text files belonging to a group.

In a case where a file is deleted from a group or erased, naturally the linkage between the group file and the image, audio and text files shown in FIGS. 10 and 11 is erased.

In order to add a file to an existing group, the file to be added and the group icon to which the file is to be added are selected by the pointing device in FIG. 5 to activate grouping. In these operations, it is possible to select a plurality of files other than those in a group.

Image files, audio files and text files reside in the recording medium independently. It is possible to group several of these files. Specifically, a plurality of files are selected in the file list by means of the pointing device, and a grouping button 508 shown in FIG. 5 is activated by the pointing device, thereby creating a group file to which the selected image, audio and text files will belong.

Thus, in the embodiment described above, data representing a single image or a plurality of images can be recorded in a form linked to audio data and text data, and the associated files thus linked can be retrieved at high speed and reproduced from both the image file and the audio and/or text file. As a result, an expression interrelating image, audio and text files can be edited with ease.

Further, since audio data or image data is converted to text data by character recognition processing, an image can be annotated using only a small amount of memory capacity.

Further, it is possible to perform retrieval on the basis of text added as an annotation, and the text can be used as a keyword when a data base is created.

It should be noted that the present invention can be applied to changes and modifications of the above-described embodiment without departing from the spirit of the invention. For example, the present invention can be applied to a system constituted by a plurality of devices or to an apparatus comprising a single device. Furthermore, it goes without saying that the invention is applicable also to a case where the object of the invention is attained by supplying a program to a system or apparatus.

The present invention is not limited to the above embodiments and various changes and modifications can be made within the spirit and scope of the present invention. Therefore, to apprise the public of the scope of the present invention, the following claims are made.

What is claimed is:

1. A data processing apparatus comprising:
   (a) input means for inputting image data and audio data;
   (b) storing means for operably storing the image data and the audio data attached to the image data;
   (c) discriminating means for discriminating whether the audio data is attached to the image data stored in said storing means;
   (d) display means for displaying a list of icon groups, each of the icon groups comprising a first icon corresponding to the image data stored in said storing means and a second icon corresponding to the audio data stored in said storing means and attached to the image data;
   (e) display controlling means for controlling said display means according to the result of the discrimination by said discriminating means to display the first and second icons simultaneously with and adjacent to each other in the case that the audio data is attached to the image data.

2. An apparatus according to claim 1, further comprising character recognition means for producing text data from the image data by character recognition.

3. An apparatus according to claim 1, further comprising audio recognition means for producing text data from the audio data by audio recognition.

4. An apparatus according to claim 2, wherein said storing means stores the text data in association with the image data and the audio data.

5. An apparatus according to claim 3, wherein said storing means stores the text data in association with the image data and the audio data.

6. A data processing apparatus comprising:
   (a) input means for inputting image data and character data;
   (b) storing means for operably storing the image data and the character data attached to the image data;

(c) discriminating means for discriminating whether the character data is attached to the image data stored in said storing means;

(d) display means for displaying a list of icon groups, each of the icon groups comprising a first icon corresponding to the image data stored in said storing means and a second icon corresponding to the character data stored in said storing means and attached to the image data; and (e) display controlling means for controlling said display means according to the result of the discrimination by said discriminating means to display the first and second icons simultaneous with and adjacent to each other in the case that the character data is attached to the image data.

7. An apparatus according to claim 6, further comprising character recognition means for producing the character data from the image data by character recognition.

8. An apparatus according to claim 6, wherein said input means inputs audio data, and further comprising audio recognition means for producing the character data from the audio data by audio recognition.

9. An apparatus according to claim 6, wherein said input means inputs audio data and said storing means operably stores the audio data attached to the image data.

10. A method of processing data comprising:

(a) inputting step of inputting image data and another data;

(b) storing step of operably storing the image data and said another data attached to the image data;

(c) discriminating step of discriminating whether said another data is attached to the image data stored in said storing means;

(d) displaying step of displaying on a display means a list of icon groups, each of the icon groups comprising a first icon corresponding to the image data stored in said storing means and a second icon corresponding to another data stored in said storing means and attached to the image data; and (e) display controlling step of controlling said display means according to the result of the discrimination by said discriminating means to display the first and second icons simultaneously with and adjacent to each other in the case that said another data is attached to the image data.

11. The method of claim 10, further comprising a producing step of producing text data from the image data by character recognition.

12. The method of claim 10, wherein said another data includes audio data, the method further comprising a producing step of producing text data from the audio data by audio recognition.

13. The method of claim 12, wherein said storing step stores the text data in association with the image data and the audio data.

14. A method of processing data comprising:

(a) inputting step of inputting image data and character data;

(b) storing step of operably storing in storing means the image data and said character data attached to the image data;

(c) discriminating step of discriminating whether the character data is attached to the image data stored in said storing means;

(d) displaying step of displaying on a display means a list of icon groups, each of the icon groups comprising a first icon corresponding to the image data stored in said storing means and a second icon corresponding to the character data stored in said storing means and attached to the image data; and (e) display controlling step of controlling said display means according to the result of the discrimination by said discriminating step to display the first and second icons simultaneously with and adjacent to each other in the case that the character data is attached to the image data.

15. The method according to claim 14, further comprising a character recognition step of producing the character data from the image data by character recognition.

16. The method according to claim 14, wherein said inputting step inputs audio data, said method further comprising an audio recognition step of producing the character data from the audio data by audio recognition.

17. The method according to claim 14, wherein said inputting step inputs audio data and said storing step operably stores audio data attached to the image data.

18. The apparatus according to claim 1, further comprising designation means for designating the first or second icon displayed by said display means and reproduction means for reproducing the image data corresponding to the first icon in a case that the first icon is designated by said designation means, and the audio data corresponding to the second icon in a case that the second icon is designated by said designation means.

19. The apparatus according to claim 6, further comprising designation means for designating the first or second icon displayed by said display means and reproduction means for reproducing the image data corresponding to the first icon in a case that the first icon is designated by said designation means, and the character data corresponding to the second icon in a case that the second icon is designated by said designation means.

20. The method according to claim 10, further comprising a designating step of designating the first or second icon displayed on said display means and a reproducing step of reproducing the image data corresponding to the first icon in a case that the first icon is designated by said designating step, and said another data corresponding to the second icon in a case that the second icon is designated by said designating step.

21. The method according to claim 14, further comprising a designating step of designating the first or second icon displayed on said display means and a reproducing step of reproducing the image data corresponding to the first icon in a case that the first icon is designated by said designating step, and the character data corresponding to the second icon in a case that the second icon is designated by said designating step.

* * * * *

UNITED STATES PATENT AND TRADEMARK OFFICE
CERTIFICATE OF CORRECTION

PATENT NO. : 6,334,025 B1
DATED : December 25, 2001
INVENTOR(S) : Yamagami

It is certified that error appears in the above-identified patent and that said Letters Patent is hereby corrected as shown below:

Column 6,
Line 43, delete "is" and insert therefor -- in --

Column 8,
Line 46, delete "1,4" and insert therefor -- 1.4 --

Column 11,
Line 11, delete "doubling" and insert therefor -- double --

Column 12,
Line 29, delete "liked" and insert therefor -- linked --

Signed and Sealed this

Seventeenth Day of September, 2002

Attest:

JAMES E. ROGAN
Attesting Officer    Director of the United States Patent and Trademark Office